United States Patent
Giles et al.

(10) Patent No.: US 12,173,694 B2
(45) Date of Patent: Dec. 24, 2024

(54) REDUCTION OF EDGEWISE VIBRATIONS USING BLADE LOAD SIGNAL

(71) Applicant: VESTAS WIND SYSTEMS A/S, Aarhus (DK)

(72) Inventors: Alexander Duncan Giles, Oporto (PT); Jesper Sandberg Thomsen, Hadsten (DK); Gustavo Oliveira Violato, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/260,466

(22) PCT Filed: Jan. 3, 2022

(86) PCT No.: PCT/DK2022/050002
§ 371 (c)(1),
(2) Date: Jul. 5, 2023

(87) PCT Pub. No.: WO2022/148516
PCT Pub. Date: Jul. 14, 2022

(65) Prior Publication Data
US 2024/0068443 A1  Feb. 29, 2024

(30) Foreign Application Priority Data
Jan. 6, 2021 (DK) .............. PA 2021 70006

(51) Int. Cl.
*F03D 7/02* (2006.01)
*F03D 13/20* (2016.01)

(52) U.S. Cl.
CPC ......... *F03D 7/0298* (2023.08); *F03D 7/0224* (2013.01); *F03D 13/201* (2023.08); *F05B 2240/912* (2013.01); *F05B 2260/96* (2013.01)

(58) Field of Classification Search
CPC . F03D 7/0224; F03D 7/0296; F05B 2270/334
See application file for complete search history.

(56) References Cited

U.S. PATENT DOCUMENTS

2011/0229300 A1*  9/2011  Kanev ............... F03D 7/043
                                                  415/33

FOREIGN PATENT DOCUMENTS

| EP | 2447527 A1 * | 5/2012 | ........... F03D 7/0224 |
| WO | WO-2015091179 A1 * | 6/2015 | ........... F03D 7/0224 |

(Continued)

OTHER PUBLICATIONS

Danish Patent and Trademark Office, 1st Technical Examination including The Search Report and Search Opinion for Application PA 2021 70006 dated Jun. 18, 2021.

(Continued)

*Primary Examiner* — Justin D Seabe
(74) *Attorney, Agent, or Firm* — Patterson + Sheridan, LLP

(57) ABSTRACT

The present invention relates to control of a wind turbine to reduce structural loading due to vibrations of the blades along the edgewise direction. A rotor control system for actuating pitch of pitch-adjustable rotor blades of a wind turbine is disclosed. Pitch modification signals are determined based on edgewise load signals for each of the rotor blades. The edgewise load signal are coordinated transformed and input into a primary whirling controller unit to provide whirling signal components which can be used for determining the pitch modification signals.

20 Claims, 4 Drawing Sheets

(56) References Cited

FOREIGN PATENT DOCUMENTS

| WO | 2017092773 A1 | 6/2017 |
| WO | 2018019345 A1 | 2/2018 |
| WO | 2019154470 A1 | 8/2019 |
| WO | 2019219138 A1 | 11/2019 |
| WO | 2020239177 A1 | 12/2020 |

OTHER PUBLICATIONS

PCT, Notification of Transmittal of The International Search Report and The Written Opinion of The International Searching Authority, or The Declaration for Application PCT/DK2022/050002 dated Mar. 29, 2022.

* cited by examiner

REDUCTION OF EDGEWISE VIBRATIONS USING BLADE LOAD SIGNAL

FIELD OF THE INVENTION

The present invention relates to control of a wind turbine to reduce structural loading due to vibrations of the blades along the edgewise direction.

BACKGROUND OF THE INVENTION

Wind turbines, as known in the art, comprise a tower supporting a nacelle and a rotor with a number of pitch-adjustable rotor blades.

A wind turbine is prone to vibrations since it comprises a large mass placed at the end of a slender tower. Examples of these vibrations include nacelle movement and blade movement. It is known in the art that certain types of vibrations can be damped by actively pitching of the blades and/or adjusting the generator torque. Edgewise vibrations are generally undesirable as the blades are typically weakly damped in that direction, and there is a higher risk of damaging the blades due to vibrations along the edgewise direction than along the flapwise direction. In particular, for longer blades, there may be an increased rotor-speed sensitivity towards blades accumulating damage in the edgewise direction compared to the flapwise direction.

It is known that edgewise vibrations can be eliminated by shutting down the wind turbine for a period of time if potentially damaging edgewise vibrations of the blades are detected. However, if these vibrations are detected often, this method will reduce the overall output of the wind turbine. As an alternative, active pitching to dampen the edgewise vibrations can be applied.

WO 2018/019345 discloses one example of a solution to mitigate edgewise vibration by use of pitch. Here it is disclosed that based on a motion parameter of the edgewise rotor blade vibration a blade pitch angle control signal is generated so that a resulting force on the rotor blade is opposite and proportional to the edgewise rotor blade vibration velocity.

Nevertheless, there is a need in the art for further ways of mitigating edgewise blade vibrations.

SUMMARY OF THE INVENTION

It would be advantageous to achieve an improved manner of reducing vibrations in a wind turbine. In this regard, it would be desirable to provide a control system which can instruct a pitch actuator in a manner that assists in reducing edgewise vibrations of the rotor blades of a wind turbine.

Accordingly, in a first aspect, there is provided a rotor control system for actuating pitch of pitch-adjustable rotor blades of a wind turbine, the rotor control system comprises a pitch actuating unit for determining pitch modification signals to be applied to a pitch actuator for actuating the pitch of the pitch adjustable rotor blades;

the pitch actuation unit being arranged to:
receive an edgewise load signal for each of the adjustable rotor blades;
apply an m-blade coordinate transformation to the edgewise load signal to transform the signal to a reference frame along a first and a second reference direction, thereby providing a first signal component and a second signal component;
input the first signal component and the second signal component in a primary whirling controller unit to provide a first primary whirling signal component and a second primary whirling signal component, respectively, wherein the primary whirling controller unit comprises:
a primary notch filter at a first whirling frequency;
a primary signal gain;
provide a first resulting signal component as the first primary signal component and a second resulting signal component as the second primary signal component;
apply an inverse m-blade coordinate transformation to the first resulting signal component and the second resulting signal component to obtain the pitch modification signals; and
apply the pitch modification signals to the pitch actuator.

The present invention provides a rotor control system which uses pitch modification signals for actuating pitch of pitch-adjustable rotor blades to obtain a reduction in edgewise vibrations of the blades of the turbine. The pitch modification signal is based on an m-blade coordinate transformation based on an input signal. An m-blade coordinate transformation transforms a signal between coordinate reference frames. While it is generally known to apply m-blade coordinate transformations in connection with pitch actuation, the inventors of the present invention have realized that by proper application of m-blade coordinate transformations, together with the disclosed signal filtering, it is possible to use the pitch system to create a moment (or in-plane force) in response to an edgewise load signal, possibly in the form of a measured edgewise blade root bending moment, that have an attenuating effect on edgewise vibrations in the blades. Here it should be noted that since the input signals are based on a load signal, and not a velocity signal, the resulting attenuating effect is not to be understood as a damping effect; rather, the system creates a disturbance which reduces the vibration of the blade. The m-blade coordinate transformation transforms the signal between the rotating frame of the blades and a fixed frame of nacelle.

The inventors of the present invention have realized that by proper signal treatment of an edgewise load signal, a pitch signal can be determined which reduces edgewise vibrations of the blades. As wind turbine blades grow longer, there is a risk of increased problems with edgewise vibrations, as the edgewise blade frequencies for longer blades will normally be closer to the operational frequencies of the rotor than for shorter blades. The problem may further increase for higher towers, due to a potential coupling between torsional movement of the tower and the edgewise vibrational modes. The invention provides a solution which based on blade sensors and a controller can determined a pitch modification signal to be applied to the pitch actuator. This is a more cost-effective solution than either stiffening of wind turbine blades or the wind turbine tower. For the rotor blades of a given wind turbine, the edgewise frequency is known and typically pre-programmed into the general turbine controller.

The m-blade transformation is also referred to in the art as a multi-blade transformation. In an embodiment the m-blade coordinate transformation is a Coleman transformation. However, other transformations may also fall into the category of m-blade coordinate transformations, hereunder so-called d-q transformation and Park transformation or similar transformations. It is within the abilities of the skilled person to determine an alternative transformation which may not strictly be a Coleman transformation, but which operates in an equivalent manner.

As used herein, the m-blade transformation is applied both as is (i.e. without a prefix) and in an inverse form. In general, the m-blade transformation is a transformation between a first coordinate frame and a second coordinate frame, and the m-blade transformation takes signal from the first frame to the second frame, whereas the inverse m-blade transformation takes the signal from the second frame to the first frame. In this regard, signals may be measured, modified and actuated in same or different coordinate frames. In an embodiment, the m-blade coordinate transformation takes a signal measured in a rotating reference, or coordinate, frame, i.e. one signal obtained for each rotating blade, and transforms the signal into a fixed reference frame of two components. The inverse m-blade transformation takes the two signal components and transforms them back to the rotating frame to provide signal components (the pitch modification signals) which can be imposed onto the three pitch actuators. This embodiment is applicable to a three-bladed wind turbine. For a turbine with a different number of blades, the m-blade transformations need to be adjusted accordingly.

The first signal component and the second signal component are filtered in a primary whirling controller unit to provide a first primary whirling signal component and a second primary whirling signal component, respectively. The primary whirling controller unit modifies the signal by signal treatment by applying a primary notch filter at a first whirling frequency and a primary signal gain. In an embodiment, the first whirling frequency is either a backward whirling frequency or a forward whirling frequency.

The rotor modes of the rotor include a symmetric mode and two whirling modes for each blade mode. Thus, for each edgewise vibration mode, there exists a backward whirling mode and a forward whirling mode, where the terms backward and forward are typically defined relative to the rotor rotation. In general, a backward whirling frequency, also referred to as a backward whirling edge frequency, is to be understood as an edgewise frequency of a given order, f, subtracted with the rotor frequency. Typically, the edgewise frequency is the first order edgewise frequency and the rotor frequency is 1P. However, other orders may be relevant in certain situations. A forward whirling frequency, also referred to as a forward whirling edge frequency, is a corresponding frequency but where the edgewise frequency of a given order, f, is added with the rotor frequency 1P.

In a general embodiment, the rotor control system is implemented with the purpose of targeting either backward whirling modes or forward whirling modes or both whirling modes. In a situation where a backward whirling mode is targeted, the primary notch filter is set around the corresponding forward whirling frequency. That is, the first whirling frequency is set as the forward whirling frequency. In a similar manner, in a situation where a forward whirling mode is targeted, the primary notch filter is set around the corresponding backward whirling frequency. That is, the first whirling frequency is set as the backward whirling frequency. In this manner, signal content related to the non-targeted whirling mode is removed by the notch filter.

In an embodiment, both the backward whirling mode and the forward whirling mode are targeted in parallel. In this embodiment the rotor control system further comprises filtering the first signal component and the second signal component in a secondary whirling controller unit to provide a first secondary whirling signal component a second secondary whirling signal component. The secondary whirling controller unit modifies the signal by signal treatment by applying a secondary notch filter at a second whirling frequency and a secondary signal gain.

The first whirling controller unit and the second whirling controller unit target different whirling modes, so that if the first whirling controller unit targets backward whirling, then the second whirling controller unit targets forward whirling, and vice versa. Thereby if the first whirling frequency is set as the forward whirling frequency, the second whirling frequency is set as the backward whirling frequency, and vice versa.

In the situation where both the backward whirling mode and the forward whirling mode are targeted in parallel, the resulting signal components are modified to include also the further whirling components. Thus the first secondary whirling component is combined with the first primary signal component to provide the first resulting signal component, and the second secondary whirling component is combined with the second primary signal component to provide the second resulting signal component.

In a system it may be sufficient to target only a single whirling mode. Nevertheless, it may be advantageous to target both backward and forward whirling modes in parallel, thereby reducing the risk that the pitch activity to target one mode, excite the other mode. In generally it is advantageous that the backward whirling component can be handled independently of the forward whirling component by application of a respective controller gain, allowing the controller to effectively target specific whirling modes.

In an embodiment, the two signal components are high-pass filtered to remove low frequency content. By removing low frequency content the influence of the gravitation in the load signals can be removed or at least significantly reduced. This is beneficial as the pitching activity due to gravitational influences on the blade load can be removed, which would otherwise be expensive for the blade bearings in terms of fatigue. Moreover, the subsequent filtering can be better tailored to the edgewise vibration, allowing the control action to be treated independently of other control features present in the wider controller.

The high-pass filter may be set to remove signal frequency content substantially below the rotor frequency 1P which appears as DC content at 0 Hz in the fixed frame. The cut-off frequency may set between the backward whirling frequency and 0 Hz, e.g. one decade below the first backward whirling frequency. In this manner the DC content can be removed while ensuring that the frequency content around the first backward whirling frequency, and other relevant whirling frequencies, are maintained.

The physical system or computational units may introduce delays in the signal path, and there may be a need for adjusting the timing of the pitch actuation or direction of the resulting force vector of the pitch activity. This may be done by signal treatment of the first and/or second signal components, e.g. by applying phase shifts, to adjust the phase of the respective signal component. In an embodiment the phase of the respective signal component is adjusted by applying a dynamic filter, such as a lead/lag filter. In another embodiment rotational operators may be applied to adjust the phase difference between signal components in the fixed frame. Such signal treatment may result in a more efficient edgewise vibration reduction.

In embodiments an activation element is applied. The activation may e.g. be dependent on an operational point and/or on the edgewise load signal, or other signals. In this manner it may be ensured that the added fatigue to the pitch bearing may only be done in situation where reduction of edgewise vibrations are sufficiently important.

In a further aspect, the invention relates to a wind turbine comprising the rotor control system according the first aspect. In yet further aspects, the invention relates to a method of actuating pitch of pitch adjustable rotor blades of a wind turbine and to a computer program product. The computer program product may be provided on a computer readable storage medium or being downloadable from a communication network. The computer program product comprises instructions to cause a data processing system, e.g. in the form of a controller, to carry out the instruction when loaded onto a data processing system.

In general, the rotor control system may be implemented on a unit or collection of functional units which comprises one or more processors, input/output interface(s) and a memory capable of storing instructions can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
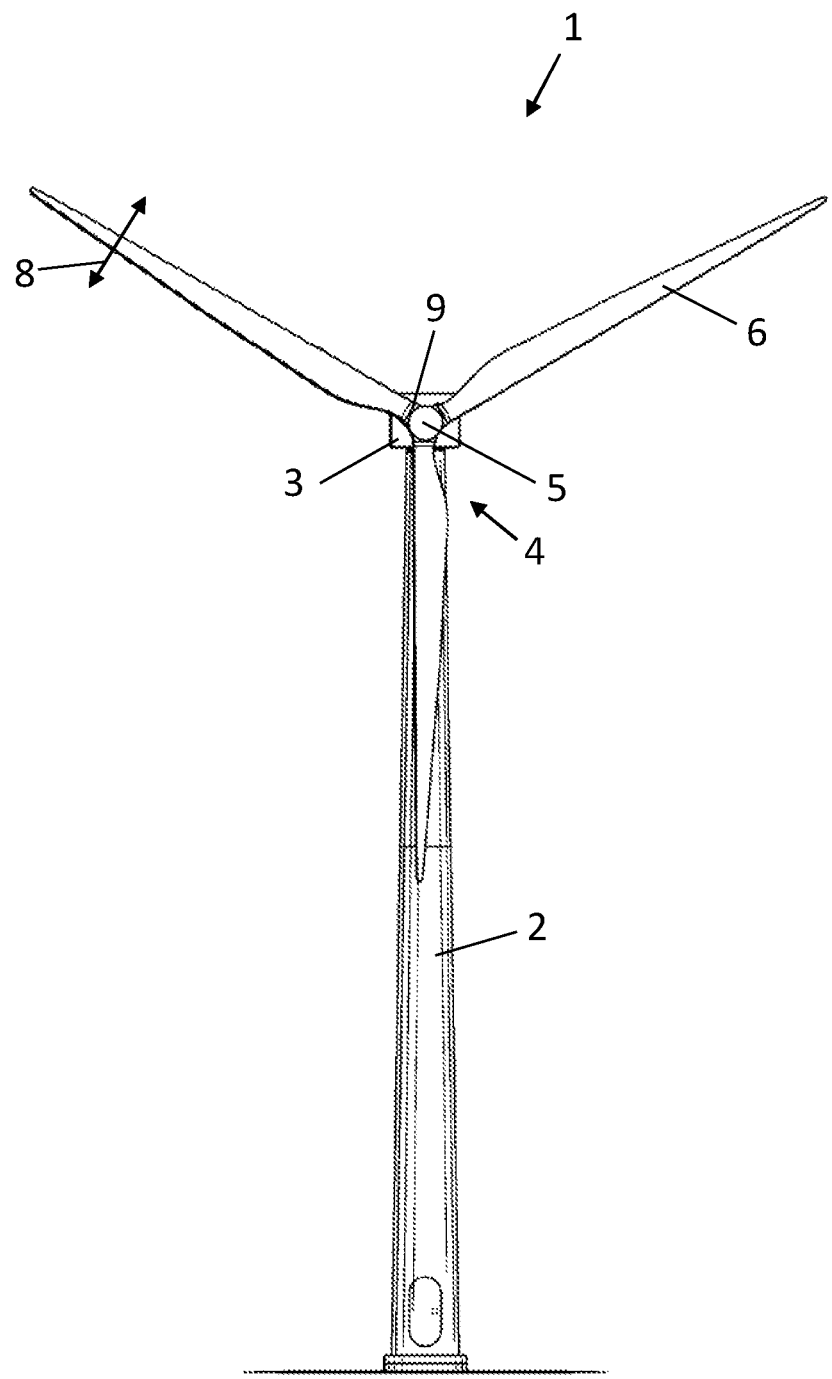
FIG. 1 illustrates, in a schematic view, an example of a wind turbine.

FIG. 1 illustrates, in a schematic view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle, in the tower or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint.

Each rotor blade of the turbine may vibrate in the edgewise direction 8, that is vibrations or oscillations along the chord between the trailing edge and the leading edge of the blade. In general, when referring to 'an edgewise rotor blade vibration', such reference is made to the first edgewise bending mode; however, the disclosure made herein is also relevant to higher order edgewise bending mode with the appropriate adaptations. An edgewise vibration may be measured and/or detected in different manners. In one embodiment, the edgewise vibration is measured at the blade root 9 by means of blade load sensors placed at each blade root in a manner so that the sensor detects loading in the edgewise direction. Such sensor may in embodiments be a strain gauge sensor or an optical Bragg-sensor. As the sensors are placed on the rotating blade, such edgewise load signals for each of the adjustable rotor blades are measured in the rotating reference frame of the rotor.

Figure 2:
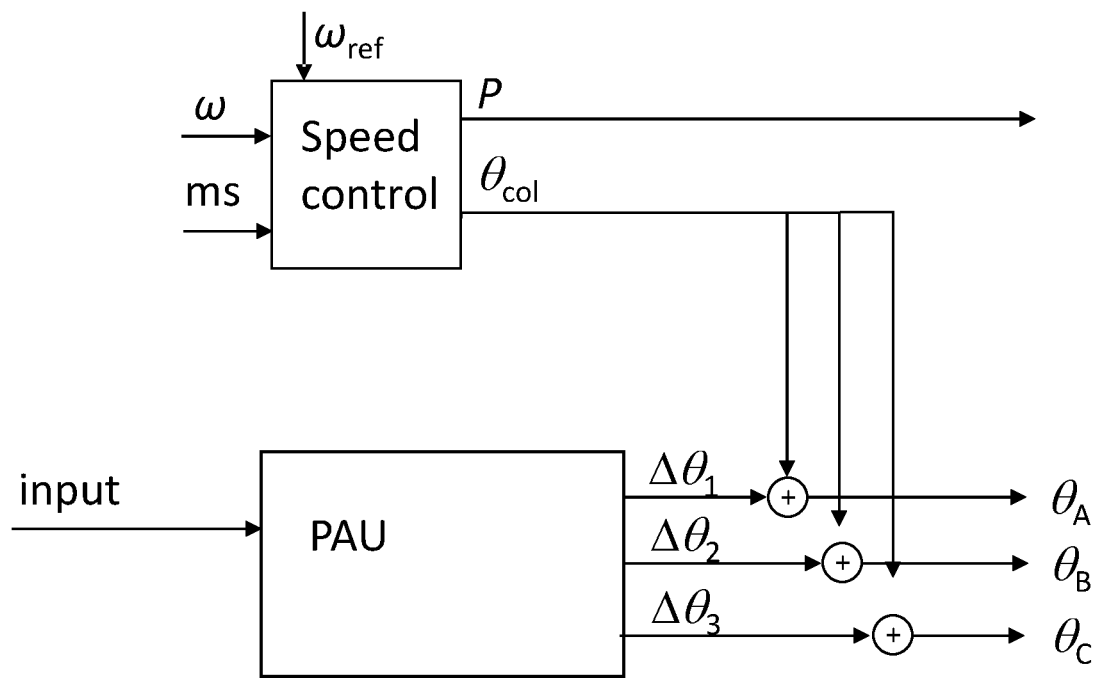
FIG. 2 is a diagram schematically illustrating an embodiment of a feedback speed controller.

FIG. 2 is a diagram schematically illustrating an embodiment of a feedback speed controller implemented to determine individual pitch actuation signals capable of reducing edgewise vibrations in accordance with embodiments of the present invention. In the illustrated implementation, the speed controller minimizes a speed error ($\omega-\omega_{ref}$) between the actual rotor speed, w, and a reference rotor speed, $\theta_{ref}$, in order to output a requested power P (in the form of a power setpoint) and a collective pitch reference, $\theta_{col}$. The collective pitch reference as determined by the speed controller, in view of the rotor speed, may also take further sensor values into account, this is referred to in FIG. 2 as a measurement set, ms, being input into the speed controller. The feedback speed controller may be implemented by a PI, PID or similar control schemes. In an embodiment, the speed controller may alternatively be a model predictive controller which based on minimizing a cost function is arranged to determine the collective pitch reference and/or the power reference.

Figure 3:
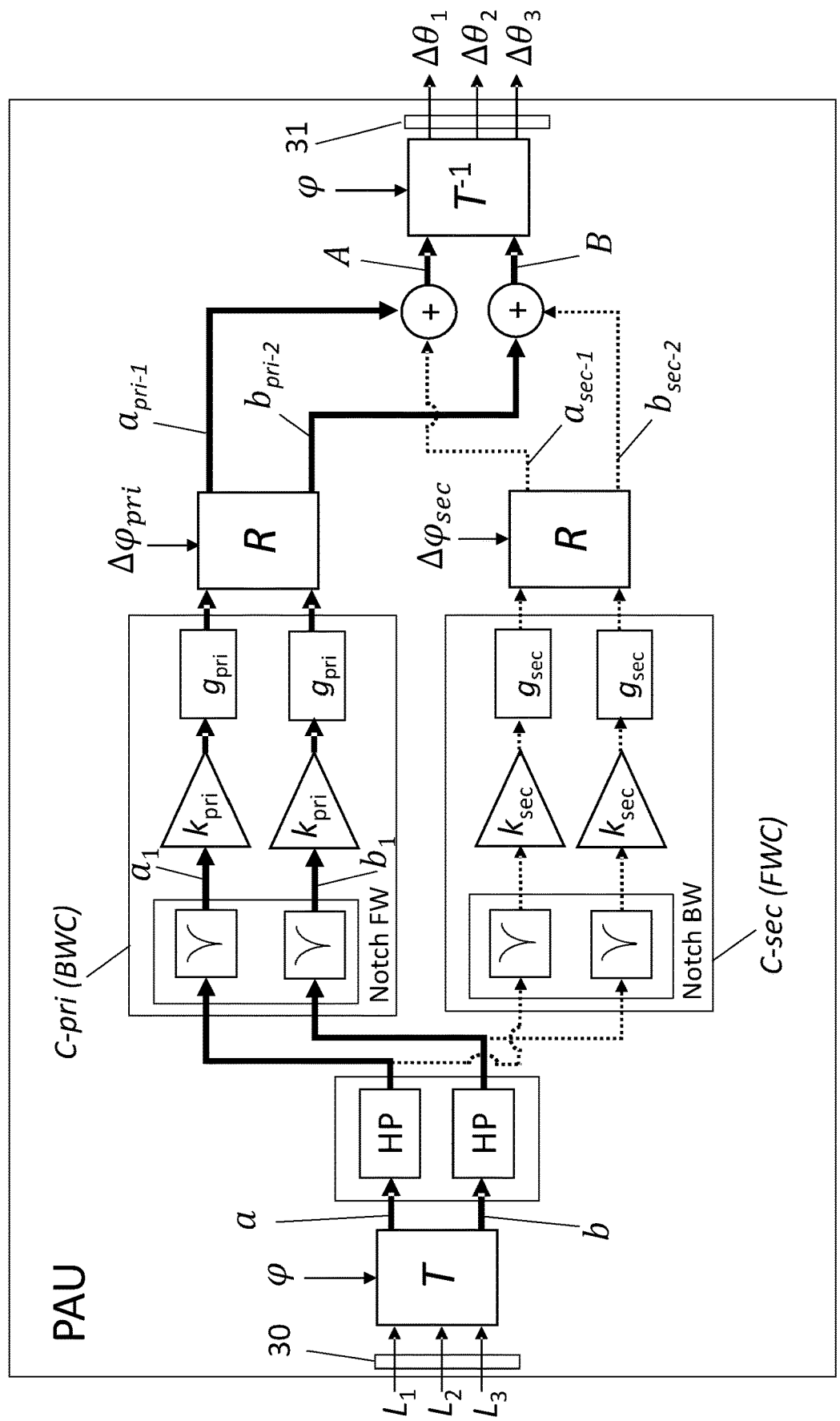
FIG. 3 schematically illustrates an embodiment of a pitch actuation unit with a Coleman transformation computing block.

FIG. 2 further illustrates a vibration reducing control block referred to as pitch actuation units (PAU). In the pitch actuation unit pitch modification signals ($\Delta\theta_1$, $\Delta\theta_2$, $\Delta\theta_3$) are being determined based on input signal(s), the input signal include edgewise load signals. An embodiment of the implementation of the pitch actuation unit (PAU) is illustrated in FIG. 3.

The PAU control unit determines pitch modification signals ($\Delta\theta_1$, $\Delta\theta_2$, $\Delta\theta_3$) for each rotor blade which are superimposed onto the collective pitch reference to provide resulting pitch modification signals ($\theta_A$, $\theta_B$, $\theta_C$) that can be applied to the pitch actuators of the rotor blades individually, and thereby reducing edgewise blade vibrations.

In the embodiment shown in FIG. 2, a collective pitch reference for the pitch-adjustable rotor blades is being determined based on a rotor speed and a resulting pitch modification signal is being applied to the pitch-adjustable rotor blades. The resulting pitch modification signal being applied to the pitch-adjustable rotor blades individually, and for each individual blade being based on a combined signal of the collective pitch reference and the individual pitch modification signals. In an embodiment, the individual pitch modification signal is being applied in a cyclic manner.

Thus, pitch actuation signals are determined for each pitch adjustable rotor blade based on the pitch modification signal for each rotor blade.

FIG. 3 schematically illustrates an embodiment of a pitch actuation unit (PAU) which based on an m-blade coordinate transformation (T), in the form of a Coleman transformation, determines pitch modification signals which when applied by the pitch actuator generates pitch actuation signals that will reduce edgewise blade vibrations.

The pitch actuation unit PAU is arranged to receive an edgewise load signal for each of the adjustable rotor blades ($L_1$ to $L_3$). The edgewise load signal being measured in a rotating reference frame. The edgewise load signals are coordinate transformed by the m-blade coordinate transformation in the form of a Coleman transformation T The Coleman transformation takes the three rotating signals into a fixed reference frame along a first and a second reference direction, thereby providing a first signal component, a, and a second signal component, b.

In an embodiment, the three edgewise load signals ($L_1$, $L_2$, $L_3$) are transformed from the rotary frame of the rotor to the fixed frame of the nacelle by application of an m-blade coordinate transform in the form of a Coleman transform T using:

$$\begin{pmatrix} a \\ b \end{pmatrix} = \begin{pmatrix} 2 \\ 3 \end{pmatrix} \begin{pmatrix} \cos(\varphi) & \cos\left(\varphi + \frac{2\pi}{3}\right) & \cos\left(\varphi + \frac{4\pi}{3}\right) \\ \sin(\varphi) & \sin\left(\varphi + \frac{2\pi}{3}\right) & \sin\left(\varphi + \frac{4\pi}{3}\right) \end{pmatrix} \begin{pmatrix} L_1 \\ L_2 \\ L_3 \end{pmatrix}$$

with $\varphi$ being the rotor frequency.

In the illustrated embodiment, a high-pass filter HP is applied to each of the signal components a, b to remove signal frequency content below the rotor frequency of the rotor blades. The high-pass filter is set to remove signal DC frequency content, which may be implemented by removing frequency content substantially below the rotor frequency 1P.

The first and the second signal components, a and b, are input into a primary whirling controller, C-pri, and optionally, into a secondary whirling controller, C-sec.

In the illustrated embodiment of FIG. 3, each signal component is input into the primary whiling controller unit as well as the secondary whiling controller unit. In the illustrated embodiment, the primary controller unit C-pri is implemented to target the first backward whirling mode, and is also referred to as a backward whirling controller (BWC). The secondary controller unit C-sec is implemented to target the first forward whirling mode, and is also referred to as a forward whirling controller (FWC).

The primary whirling controller unit determines a first primary whirling signal component, $a_{pri-1}$ and a second primary whirling signal component $b_{pri-2}$, respectively. The secondary whirling controller unit determines a first secondary whirling signal component, $a_{sec-1}$ and a second secondary whirling signal component $b_{seci-2}$, respectively.

The primary whirling controller (backward whirling controller (BWC)) applies identical actions to both the a and the b signal components. Similarly, the secondary whirling controller (forward whirling controller (FWC)) applies identical actions to the both the a and the b components.

In the illustrated embodiment, the first signal component, a, is input in the backward whirling controller BWC to determine a first backward whirling component $a_{pri-1}$ by applying a notch filter at a forward whirling frequency (first whirling frequency) and a backward whirling signal gain $k_{pri}$ (primary signal gain) to the first signal component. Additionally, the first signal component, a, is input in the forward whirling controller FWC to determine a first forward whirling component $a_{sec-1}$ by applying a notch filter at a backward whirling frequency (second whirling frequency) and a forward whirling signal gain $k_{sec}$ to (secondary signal gain) the first signal component.

In a corresponding manner, the second signal component, b, is input in the backward whirling controller BWC to determine a second backward whirling component $b_{pri-2}$ by applying a notch filter at a forward whirling frequency and a backward whirling signal gain $k_{pri}$ to the second signal component. Additionally, the second signal component, b, is input in the forward whirling controller FWC and a second forward whirling component $b_{sec-2}$ is determined by applying a notch filter at a backward whirling frequency and a forward whirling signal gain $k_{sec}$ to the first signal component.

In a general embodiment, where only the primary whirling controller (C-pri) is used, a first resulting signal component, A, is determined as the first primary signal component and a second resulting signal component, B, is determined as the second primary signal component.

However, in the illustrated embodiment where also the secondary whirling controller is used, the first secondary whirling component is combined with the first primary signal component to provide the first resulting signal component A. Similarly, the second secondary whirling component is combined with the second primary signal component to provide the second resulting signal component B.

The resulting signal components are used as inputs into an inverse m-blade coordinate transformation $T^{-1}$ to obtain the pitch modification signals $\Delta\theta_1$, $\Delta\theta_2$, $\Delta\theta_3$. The pitch modification signals are applied to the pitch actuator.

The inverse m-blade coordinate transformation may be an inverse Coleman transformation on the general form:

$$\begin{pmatrix} \Delta\theta_1 \\ \Delta\theta_2 \\ \Delta\theta_3 \end{pmatrix} = \begin{pmatrix} \cos(\varphi) & \sin(\varphi) \\ \cos\left(\varphi + \frac{2\pi}{3}\right) & \sin\left(\varphi + \frac{2\pi}{3}\right) \\ \cos\left(\varphi + \frac{4\pi}{3}\right) & \sin\left(\varphi + \frac{4\pi}{3}\right) \end{pmatrix} \begin{pmatrix} A \\ B \end{pmatrix}$$

In the mentioned embodiment filtering comprises applying a notch filter at the backward whirling frequency and the forward whirling frequency. That is a notch filter placed around the edgewise vibration frequency f shifted either backwards or forwards by the rotor frequency, that is a notch filter placed at either (f−1P) or (f+1P).

The whirling controller units includes the application of a gains, referred to as a primary signal gain $k_{pri}$ and a secondary signal gain $k_{sec}$ to impose control actions to predefined degrees, as determined by the gains. In an embodiment, the application of the gains is a multiplication of a value to the respective signals.

There may be a need to adjust the phase of the signal components. In one embodiment the primary whirling controller unit comprises and/or the secondary whirling controller unit further comprises a phase shift filter. The signals may be phase shifted by use of a lead-lag filter in the signal paths, e.g. placed after application of the gains ($k_{pri}$, $k_{sec}$) thereby imposing a phase shift $\Delta\varphi$ to adjust the phase of the respective signal component.

In the embodiment illustrated in FIG. 3, the phase is manipulated by rotating the two components a, b using a rotation operator R which rotates the backward signal components an angle $\Delta\varphi_{pri}$ (first rotation operator) and the forward signal components an angle $\Delta\varphi_{sec}$ (second rotation operator) By rotation of the signal components, the applied force vector from the resulting pitching can be adjusted along a desired direction. In an embodiment the rotation angle of the first rotation operator and/or the second rotation operator is based on the collective pitch angle of the rotor blades.

As further shown in the embodiment of FIG. 3, the forward whirling controller unit and the backward whirling controller units comprises a gain scheduling term $g_{pri}$, $g_{sec}$. The gain scheduling terms applied in the backward whirling controller BWC ($g_{pri}$) and the gain scheduling terms applied in the forward whirling controller FWC ($g_{sec}$) may be set in the same or different manner. Dependent on the specific situation, there may be a need to treat the forward or backward whirling component differently.

In an embodiment the gain scheduling terms being dependent upon an operational point of the wind turbine. The pitch angle and/or rotor speed may be used to schedule the gains. For example, a low rotor speed, or at rotor speeds far from the edgewise blade vibration frequency, the gain may be set low. There may also be pitch angle ranges, where it is known that the pitching does not have a large effect on reducing the edgewise vibrations, and therefore the pitch activity may be reduced to reduce the fatigue impact. Likewise, the gain scheduling terms may be set based on a functional relationship with the pitch angle.

Additionally, further signal treatment may be applied to further improve the signals. For example, further signal treatment may be applied 30 to the edgewise load signals and/or applied 31 to the pitch modifications signals. Such further signal treatment may be further notch filters and band pass filters for removing signal content not relevant for the whirling controller units or the pitch actuator.

The rotor control system may further comprise an activation element. The activation element may be a dedicated activation element or implemented in the gain scheduling as a zero gain when the control system is deactivated. Other implementations of an activation element are also possible. The activation element may be dependent upon an operational point of the wind turbine. In this manner, it can be ensured that the controller is active in operational conditions such as turbulence or other conditions where there is an elevated risk of edgewise vibrations building up.

In an embodiment the activation element may be made dependent upon the edgewise load signal of at least one adjustable rotor blade. For example, the signal content of the load signal at the edgewise frequency may be inserted into a root-mean-square RMS filter component, and a threshold may be set to the RMS signal, above which the pitch activation is enabled.

Figure 4:
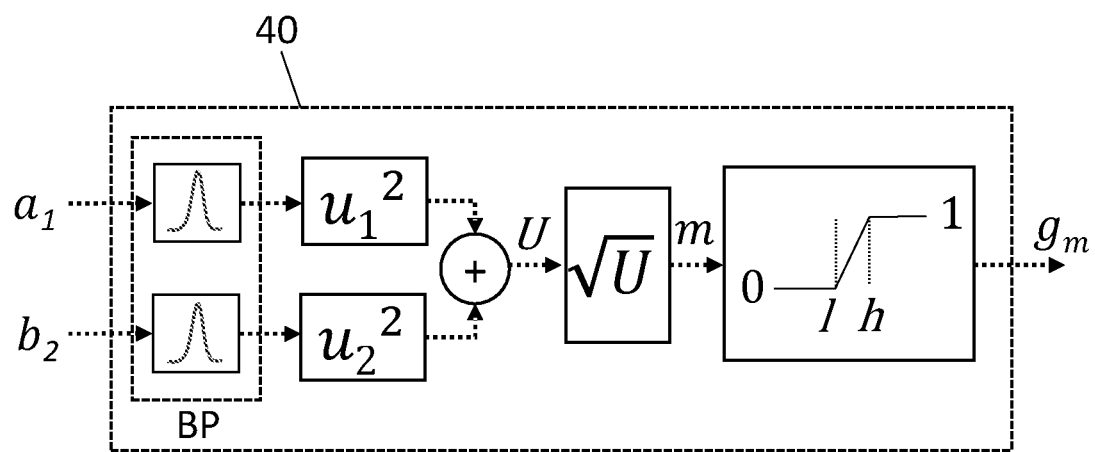
FIG. 4 schematically illustrates an embodiment of an implementation of an activation element.

FIG. 4 illustrates an embodiment where the primary whirling controller unit comprising an activation element of the RMS type being dependent upon the edgewise load signal of at least one adjustable rotor blade. A similar activation element may be implemented also for the secondary whirling controller unit.

In the illustrated embodiment, the first and second signal components, after passage of the notch filter, are inserted into a gain scheduling unit 40. Each signal component is passed through a bandpass filter (BP) centred at the backward whirling frequency. In general, the bandpass filter is centred at the target frequency, so if the whirling controller unit is a backward whirling controller unit, the bandpass filter is centred at the backward whirling frequency, and vice versa for a forward whirling controller unit. The bandpassed signal is squared ($u_1^2$; $u_2^2$), summed and the square root of the sum signal U is evaluated in terms of a lower threshold (l), below which a zero is sent out, and upper threshold (h), above which a unity factor is sent out, and in between where a factor between 0 and 1 is sent out. The output is a scheduling factor $g_m$, which is multiplied with the relevant signal gain (primary signal gain or secondary signal gain).

The activation element may include a hysteresis to ensure that the controller is not flipping on and off in certain conditions. The activation element may also include a timer to ensure that the controller is active for a certain time thereby increasing the likelihood that the vibration is broken.

Figure 5:
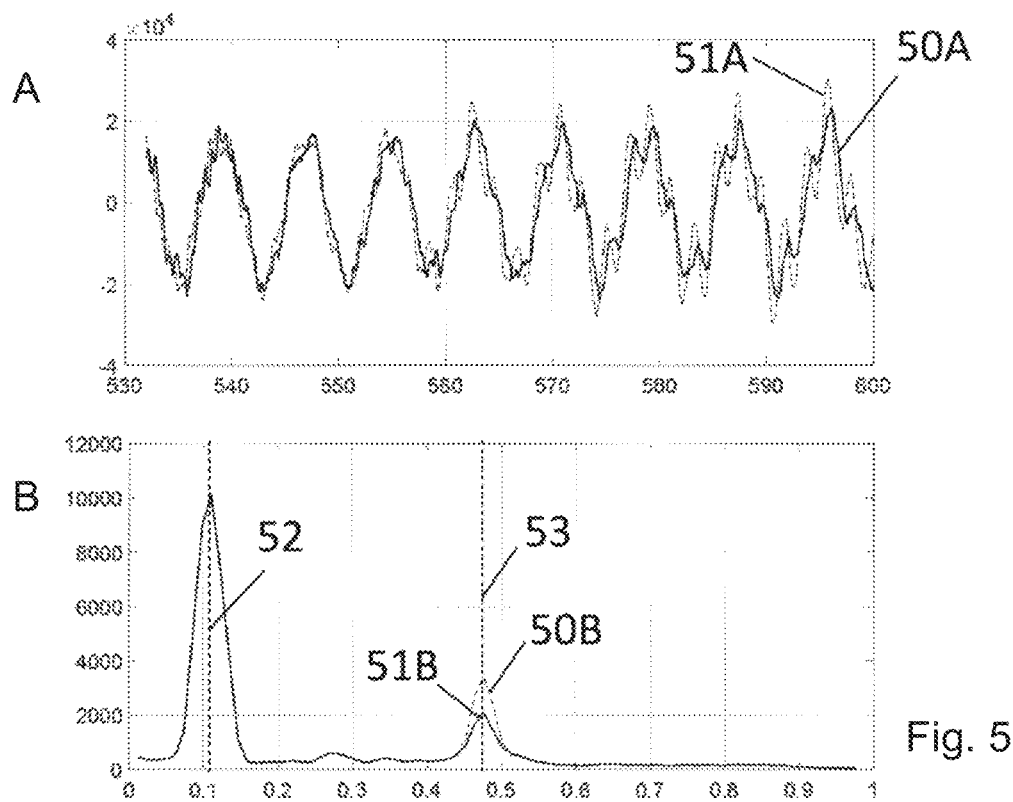
FIG. 5 illustrates simulated load signals by applying the embodiment illustrated in FIG. 3.
Figure 6:
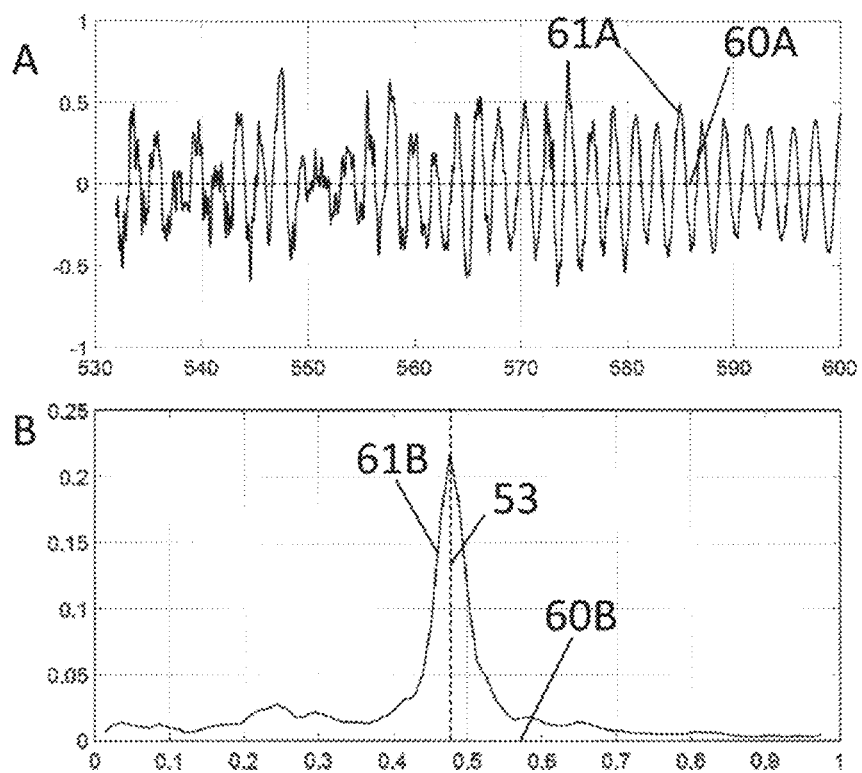
FIG. 6 illustrates simulated pitch signals by applying the embodiment illustrated in FIG. 3.

FIGS. 5 and 6 illustrate simulated signals by applying the embodiment illustrated in FIG. 3.

Graph A of FIG. 5 illustrates a time trace of the edgewise load signal of one of the rotor blades for a range between 530 and 600 seconds. While the two signals are somewhat overlaid, one trace 50A is for a situation where the PAU of FIG. 3 is not enabled, and the other trace 51A is for a situation where the PAU of FIG. 3 is enabled. The differences in the two signals are better seen in Graph B of FIG. 5 which shows an FFT plot of the signals in Graph A of FIG. 5. Here, the signal 50B is for the situation where the PAU is not enabled, whereas the signal 51B is for the situation where the PAU is enabled. Signal content is seen at two frequencies, namely at the 1P frequency 52 and the edge frequency 53 of the rotor blade. As can be seen there is not a difference in the signal content at the 1P peak since the rotor frequency is not changed, however a clear reduction of the signal content at the edge frequency is seen, due to the load reduction from the added pitch actuation. Embodiments of the present invention thus provides a rotor control system with the effect of a reduction in edgewise vibrations of the blades of the turbine.

Graph A of FIG. 6 illustrates a time trace for the added pitch signal 401 for the same time period. The time trace 60A is a flat line, as the PAU is not enabled, whereas the time trace 61A show the added pitch signal. Graph B of FIG. 6 shows an FFT plot of the signals in Graph A of FIG. 6. As can be seen a significant peak is present at the edge frequency 53 due to the added pitch activity. FIG. 6 shows that the load reduction comes at a cost, namely an increased pitch activity. As a consequence, the skilled person should in connection with the implementation of an embodiment of the invention tune the system to find a balance between load reduction and increased pitch activity.

Example embodiments of the invention have been described for the purposes of illustration only, and not to limit the scope of the invention as defined in the accompanying claims.

The invention claimed is:

1. A rotor control system for actuating pitch of pitch adjustable rotor blades of a wind turbine, the rotor control system comprising a pitch actuation unit for determining pitch modification signals to be applied to a pitch actuator for actuating the pitch of the pitch adjustable rotor blades; the pitch actuation unit being arranged to:
receive an edgewise load signal for each of the pitch adjustable rotor blades;
apply an m-blade coordinate transformation to the edgewise load signal to transform the edgewise load signal to a reference frame along a first and a second reference direction, thereby providing a first signal component and a second signal component;
input the first signal component and the second signal component in a primary whirling controller unit to provide a first primary whirling signal component and a second primary whirling signal component, respectively, wherein the primary whirling controller unit comprises:
a primary notch filter at a first whirling frequency;

a primary signal gain;
wherein the primary notch filter at the first whirling frequency and the primary signal gain are applied to the first signal component and the second signal component to provide a first resulting signal component as the first primary whirling signal component and a second resulting signal component as the second primary whirling signal component;
apply an inverse m-blade coordinate transformation to the first resulting signal component and the second resulting signal component to obtain the pitch modification signals; and
apply the pitch modification signals to the pitch actuator.

2. The rotor control system according to claim 1, further comprising:
inputting the first signal component and the second signal component in a secondary whirling controller unit to provide a first secondary whirling signal component a second secondary whirling signal component, wherein the secondary whirling controller unit comprises:
a secondary notch filter at a second whirling frequency;
a secondary signal gain;
combine the first secondary whirling signal component with the first primary whirling signal component to provide the first resulting signal component; and
combine the second secondary whirling component with the second primary whirling signal component to provide the second resulting signal component.

3. The rotor control system according to claim 1 further comprising to apply for each of the first signal component and the second signal component a high-pass filter to remove signal frequency content below a rotor frequency of the pitch adjustable rotor blades.

4. The rotor control system according to claim 2, wherein at least one of the primary whirling controller unit or the secondary whirling controller unit comprise a phase shift filter.

5. The rotor control system according to claim 1, wherein the
first primary whirling signal component and the second primary whirling signal component are rotated with a rotation operator.

6. The rotor control system according to claim 5, wherein at least one of a rotation angle of a first rotation operator or a second rotation operator is based on a collective pitch angle of the pitch adjustable rotor blades.

7. The rotor control system according to claim 1, wherein the m-blade coordinate transformation is based on a Coleman transformation.

8. The rotor control system according to claim 1 further comprising:
determine a collective pitch reference for the pitch adjustable rotor blades, the collective pitch reference being determined based on a rotor speed,
apply a resulting pitch modification signal to the pitch adjustable rotor blades, the resulting pitch modification signal being applied to the pitch adjustable rotor blades individually, and for each individual blade being based on a combined signal of the collective pitch reference and the individual pitch modification signals.

9. The rotor control system according to claim 2 wherein at least one of the primary signal gain or the secondary signal gain comprises a gain scheduling term, the gain scheduling term being dependent upon an operational point of the wind turbine.

10. The rotor control system according to claim 2, wherein at least one of the primary whirling controller unit or the secondary whirling controller unit further comprising an activation element, the activation element being dependent upon an operational point of the wind turbine.

11. The rotor control system according to claim 2, wherein at least one of the primary whirling controller unit or the secondary whirling controller unit further comprises an activation element, the activation element is dependent upon the edgewise load signal of at least one adjustable rotor blade of the pitch adjustable rotor blades.

12. The rotor control system according to claim 2, wherein the first secondary whirling signal component and the second secondary whirling signal component are rotated with a rotation operator.

13. A method of actuating a pitch of pitch adjustable rotor blades of a wind turbine, the wind turbine comprises a pitch actuator for actuating the pitch of the pitch adjustable rotor blades, the method comprises:
receiving an edgewise load signal for each of the pitch adjustable rotor blades;
applying an m-blade coordinate transformation to the edgewise load signal to transform the edgewise load signal to a reference frame along a first and a second reference direction, thereby providing a first signal component and a second signal component;
within a primary whirling controller unit, applying to the first signal component and the second signal component:
a primary notch filter at a first whirling frequency;
a primary signal gain;
thereby providing a first primary whirling signal component and a second primary whirling signal component, respectively;
providing a first resulting signal component as the first primary whirling signal component and a second resulting signal component as the second primary whirling signal component;
applying an inverse m-blade coordinate transformation to the first resulting signal component and the second resulting signal component to obtain pitch modification signals; and
applying the pitch modification signals to the pitch actuator.

14. A wind turbine, comprising:
a tower;
a nacelle disposed on the tower;
a rotor extending from the nacelle and having pitch adjustable rotor blades disposed at a distal end thereof;
a pitch actuator for actuating a pitch of the pitch adjustable rotor blades;
a rotor control system for actuating pitch of the pitch adjustable rotor blades, the rotor control system comprising a pitch actuation unit for determining pitch modification signals to be applied to the pitch actuator;
the pitch actuation unit being arranged to:
receive an edgewise load signal for each of the pitch adjustable rotor blades;
apply an m-blade coordinate transformation to the edgewise load signal to transform the edgewise load signal to a reference frame along a first and a second reference direction, thereby providing a first signal component and a second signal component;
input the first signal component and the second signal component in a primary whirling controller unit to provide a first primary whirling signal component and a second primary whirling signal component, respectively, wherein the primary whirling controller unit comprises:

a primary notch filter at a first whirling frequency;
a primary signal gain;
wherein the primary notch filter at the first whirling frequency and the primary signal gain are applied to the first signal component and the second signal component to provide a first resulting signal component as the first primary whirling signal component and a second resulting signal component as the second primary whirling signal component;
apply an inverse m-blade coordinate transformation to the first resulting signal component and the second resulting signal component to obtain the pitch modification signals; and
apply the pitch modification signals to the pitch actuator.

15. The wind turbine according to claim 14, wherein the pitch actuation unit is further arranged to:
input the first signal component and the second signal component in a secondary whirling controller unit to provide a first secondary whirling signal component a second secondary whirling signal component, wherein the secondary whirling controller unit comprises:
a secondary notch filter at a second whirling frequency; and
a secondary signal gain;
combine the first secondary whirling signal component with the first primary whirling signal component to provide the first resulting signal component; and
combine the second secondary whirling component with the second primary whirling signal component to provide the second resulting signal component.

16. The wind turbine according to claim 14, wherein the pitch actuation unit is further arranged to apply for each of the first signal component and the second signal component a high-pass filter to remove signal frequency content below a rotor frequency of the pitch adjustable rotor blades.

17. The wind turbine according to claim 15, wherein at least one of the primary whirling controller unit or the secondary whirling controller unit comprise a phase shift filter.

18. A non-transitory computer readable medium storing a computer program product comprising software code adapted to control a wind turbine when executed on a data processing system, the computer program product being adapted to perform an operation of actuating pitch of pitch adjustable rotor blades of the wind turbine, the operation comprising:
receive an edgewise load signal for each of the pitch adjustable rotor blades;
apply an m-blade coordinate transformation to the edgewise load signal to transform the edgewise load signal to a reference frame along a first and a second reference direction, thereby providing a first signal component and a second signal component;
within a primary whirling controller unit, apply to the first signal component and the second signal component:
a primary notch filter at a first whirling frequency;
a primary signal gain;
thereby providing a first primary whirling signal component and a second primary whirling signal component, respectively;
provide a first resulting signal component as the first primary whirling signal component and a second resulting signal component as the second primary whirling signal component;
apply an inverse m-blade coordinate transformation to the first resulting signal component and the second resulting signal component to obtain pitch modification signals; and
apply the pitch modification signals to a pitch actuator for actuating the pitch of the pitch adjustable rotor blades.

19. The non-transitory computer readable medium according to claim 18, wherein the operation further comprises:
inputting the first signal component and the second signal component in a secondary whirling controller unit to provide a first secondary whirling signal component a second secondary whirling signal component, wherein the secondary whirling controller unit comprises:
a secondary notch filter at a second whirling frequency; and
a secondary signal gain;
combining the first secondary whirling signal component with the first primary whirling signal component to provide the first resulting signal component; and
combining the second secondary whirling component with the second primary whirling signal component to provide the second resulting signal component.

20. The non-transitory computer readable medium according to claim 18, wherein the operation further comprises:
applying for each of the first signal component and the second signal component a high-pass filter to remove signal frequency content below a rotor frequency of the pitch adjustable rotor blades.

* * * * *